Figure 1:
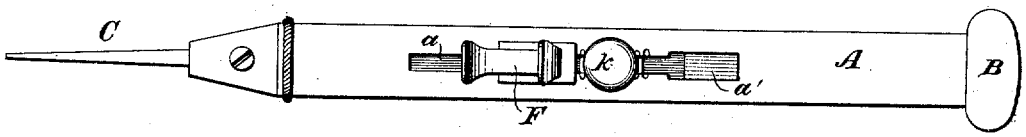

J. C. DEAN.

DENTAL HAMMER.

No. 6,817. Reissued Dec. 21, 1875.

WITNESSES

Wm. A. Skinkle

L. Stilt

By his Attorney

INVENTOR

James C Dean.

Wm. D. Baldwin

N. PETERS, PHOTO-LITHOGRAPHER, WASHINGTON, D. C.

UNITED STATES PATENT OFFICE.

JAMES C. DEAN, OF CHICAGO, ILLINOIS, ASSIGNOR TO SAMUEL S. WHITE, OF PHILADELPHIA, PENNSYLVANIA.

IMPROVEMENT IN DENTAL HAMMERS.

Specification forming part of Letters Patent No. 48,708, dated July 11, 1865; reissue No. 6,817, dated December 21, 1875; application filed December 2, 1875.

*To all whom it may concern:*

Be it known that I, JAMES C. DEAN, of Chicago, in the county of Cook and State of Illinois, have invented a new and useful Instrument for Plugging Teeth, of which the following is a specification:

My invention relates to that class of instruments for plugging teeth known as dental hammers or mallets.

In the use of such instruments prior to the date of my invention the tool was held in one hand by the dentist, and struck with a hammer or mallet handled by himself or his assistant.

The object of the first part of my invention is to secure a light, compact, and portable instrument, capable of being held in the hand of the operator; to which end my improvement consists in mounting the dental instrument and its actuating mallet in a handle capable of being readily manipulated by the operator.

The object of the next part of my invention is to protect the working parts of the mechanism from catching in or entangling with the person or clothing of the operator or patient, or other objects; to which end my improvement consists in inclosing the hammer and its actuating spring within a tubular casing.

The object of the next part of my invention is so to construct a dental mallet as readily to admit of the assemblage or separation of its constituent elements; to which end my improvement consists in so organizing the apparatus that the tool-holder, the mallet, and its actuating spring may be inclosed within a handle or tubular casing furnished with screw-caps at its ends, to hold the parts in place in the handle.

The object of the next part of my invention is to regulate the tension of the actuating spring of the mallet; to which end my improvements consist in combining with a mallet, its actuating spring, and tubular-casing, a head or screw-cap bearing upon the spring.

The object of the next part of my invention is to regulate the length of stroke of the mallet; to which end my improvements consist in combining with the mechanism which retracts the mallet an adjustable trip, which releases the mallet from its retracting mechanism at the proper moment.

The object of the next part of my invention is to deaden the jar or thud caused by the striking of metal upon metal; to which end my improvement consists in interposing between the mallet and tool an elastic material to receive the impact of the blow.

The object of the next part of my invention is always to maintain the tool-holder in the desired relation to the mallet; to which end my improvement consists in combining with the tool-holder a spring, which restores said holder to the proper position as soon as released from contact with the hammer, after being struck thereby.

The object of the next part of my invention is to maintain a tool-holder capable of sliding endwise in its handle, in the desired relation to such handle, when free from contact with the mallet; to which end my improvement consists in combining, with the handle and tool-holder, an interposed spring, acting upon each, and so arranged as to maintain the tool-holder in the position desired.

The object of the next part of my invention is to retract and release the mallet, to allow it to be thrown forward again to strike the plugger; to which end my improvement consists in combining a mallet, a catch to retract it, and a trip to release it at the proper moment.

To enable others skilled in the art to understand my invention, I will describe one mode of carrying it into effect.

Figure 2:
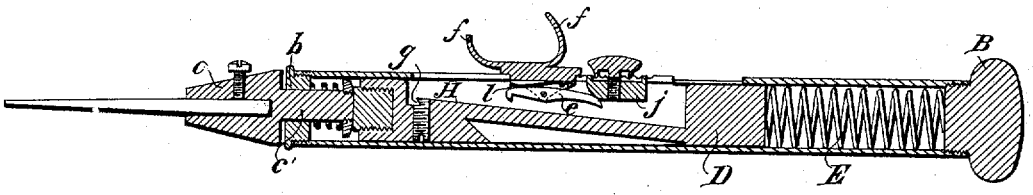

In the accompanying drawings, Figure 1 represents a plan or top view of an instrument embodying all my improvements; Fig. 2, a vertical longitudinal central section therethrough, showing the parts in the relation they assume at the moment the tool is struck by the mallet; and Fig. 3 a similar section, showing the relation of the parts the moment the mallet is released preparatory to striking the blow.

In the accompanying drawings, A represents a hollow handle, stock, casing, or handpiece, which may be made of any suitable length and diameter. An oblong longitudinal slot, *a*, in this casing terminates at one end in a slot, *a'*, of greater width than the main portion of the slot *a*. Screw-caps B *b* take into corresponding female screws at each end of the casing. The knob B serves as a cap for one end of the handle, and also protects the hand while using the instrument. The cap *b*, which is perforated, serves both as a bearing and as a guide for that portion of instrument which receives and holds the plugging-point C, and which consists of a conical socketed portion, *c*, terminating at one end in a short cylindrical stem, $c^1$, provided with an annular flange, $c^2$, at its rear end. A spiral spring, *d*, interposed between the cap *b* and flange $c^2$, encircles the stem $c^1$ of the tool-holder, and holds the tool-holder in the desired relation to the casing as well as to the hammer. Within the hollow handle A is a mallet or hammer, D, acted upon by a spring, E, interposed between the hammer and the knob B.

The hammer has a wooden plug, *d'*, inserted in its forward end for the purpose of preventing a disagreeable noise when the hammer strikes the tool-holder.

By retracting the hammer and then releasing it, its spring E will force it forward and cause it to strike the tool-holder with sufficient force to give it a quick forward movement, after which the spring *d* will return the tool-holder to its normal position.

In order to effect this movement of the hammer or mallet I employ a sliding latch, *e*, made in the form of a lever with a hook on its forward end, which hook, catch, or lever is pivoted to a slide, F, having horns or curved portions *f* formed on it. This slide reciprocates in the slot *a* of the handle, hereinbefore mentioned, and can be moved backward and forward by one of the fingers of the hand that holds the instrument. Near the forward end of the hammer D is a notch, *g*, at the end of an inclined plane, H, formed on the mallet-spindle. This notch receives the hook-lever *e* when the slide F is moved forward. A spring, *l*, interposed between the slide and hook-lever insures the engagement of the catch and hammer. A dog or tripping-block, *j*, adjustable longitudinally in the slot *a* of the handle, and secured by a set-screw, *k*, has its forward end beveled or inclined, so as to depress the rear end of the hook-lever or catch *e* when brought in contact with it by the retraction of the hammer, thus releasing the hammer and allowing its spring E to force the hammer forward against the tool-holder. When the sliding catch-lever *e* moves forward again it slides over the spindle of the mallet until the spring *l* forces it back into the notch *g*, and thus reconnects the slide and hammer. This action of the catch and releasing devices is automatic, so that the reciprocating movement of the slide will impart the required movement to the hammer.

The tripping device *j* is so applied to the handle of the instrument that it can be adjusted and set at any desired point, according to the length of stroke and force of blow, which it is necessary to give, and for this purpose notches or serrations may be made on the surface of the handle A, along the slot *a* to receive the clamping screw-head *k* and prevent the trip *j* from slipping.

Figure 3:
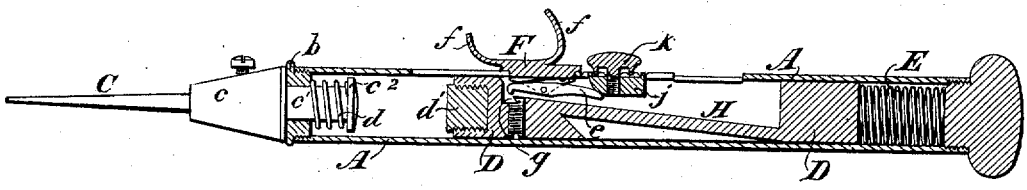

In practice the lower edge of said screw-head will be formed somewhat as shown in Figs. 2 and 3, so that the sharp edges thereof will engage with the notches in the handle, and prevent the trip *j* from moving when the slide strikes it on letting go the hammer.

I have just given a description of one mode of constructing the plugging instrument; but I do not confine my invention to the contrivances herein shown and described for operating the hammer, or for increasing or diminishing force of the blow thereof, as various devices may be employed for practically carrying out the combination of a dental point and a hammer in a single instrument.

Having thus described my invention, what I claim as new, and desire to secure by Letters Patent, is—

1. The combination, substantially as hereinbefore set forth, in a dental instrument, of a handle, a tool-holder, and a hammer actuating the tool-holder.

2. The combination, substantially as hereinbefore set forth, in a dental instrument, of the handle, with the hammer and its actuating-spring inclosed therein.

3. The combination, substantially as hereinbefore set forth, in a dental instrument of a handle, a tool-holder, a mallet, its actuating-spring, and the screw-caps which hold the parts in place within the casing, whereby they may readily be removed or replaced.

4. The combination, substantially as hereinbefore set forth, in a dental instrument, of the handle, the hammer contained therein, an adjustable screw-cap, and the impelling-spring interposed between the hammer and cap.

5. The combination, substantially as hereinbefore set forth, in a dental instrument, of a handle, a spring-hammer, and an adjustable trip, whereby the length of stroke of the mallet may be regulated.

6. The combination, substantially as hereinbefore set forth, in a dental instrument, of a tool-holder, a hammer, and elastic material interposed between the two to deaden the shock.

7. The combination, substantially as hereinbefore set forth, in a dental instrument, of a hammer, a tool-holder, and a spring which maintains the tool-holder in proper relation to the hammer.

8. The combination, substantially as hereinbefore set forth, in a dental instrument, of a handle, a tool-holder movable endwise therein, and an interposed spring which maintains the tool-holder in proper relation to the handle.

9. The combination, substantially as hereinbefore set forth, in a dental instrument, of a reciprocating mallet, a retracting-catch, and a trip to release the catch.

JAMES C. DEAN.

Witnesses:
CHARLES R. E. KOCH,
S. R. BINGHAM.